United States Patent
Zhang et al.

(10) Patent No.: US 10,708,254 B2
(45) Date of Patent: Jul. 7, 2020

(54) INFORMATION PROCESSING APPARATUS AND NON-TRANSITORY COMPUTER READABLE MEDIUM STORING INFORMATION PROCESSING PROGRAM FOR SINGLE SIGN-ON

(71) Applicant: FUJI XEROX CO., LTD., Tokyo (JP)

(72) Inventors: Zhenrui Zhang, Kanagawa (JP); Eisuke Kanno, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 81 days.

(21) Appl. No.: 15/784,197

(22) Filed: Oct. 16, 2017

(65) Prior Publication Data

US 2018/0248866 A1    Aug. 30, 2018

(30) Foreign Application Priority Data

Feb. 27, 2017   (JP) .................. 2017-035168

(51) Int. Cl.
*H04L 29/06*   (2006.01)
*H04L 29/12*   (2006.01)

(52) U.S. Cl.
CPC ...... *H04L 63/0815* (2013.01); *H04L 61/1541* (2013.01); *H04L 63/101* (2013.01); *H04L 63/102* (2013.01)

(58) Field of Classification Search
CPC .................................................. H04L 63/0815
See application file for complete search history.

(56) References Cited

U.S. PATENT DOCUMENTS

| | | | | |
|---|---|---|---|---|
| 8,955,080 B2* | 2/2015 | Brunswig | ............... | G06F 21/41 713/158 |
| 2002/0007460 A1* | 1/2002 | Azuma | ............... | H04L 63/0815 726/12 |
| 2002/0023059 A1* | 2/2002 | Bari | ........................ | G06F 21/41 705/76 |
| 2003/0126441 A1* | 7/2003 | Laux | ........................ | G06F 21/31 713/168 |
| 2003/0182551 A1* | 9/2003 | Frantz | ..................... | G06F 21/41 713/170 |
| 2004/0132433 A1* | 7/2004 | Stern | ................... | H04M 3/4931 455/414.1 |
| 2009/0271847 A1* | 10/2009 | Karjala | ............... | H04L 63/0807 726/6 |
| 2013/0291079 A1* | 10/2013 | Lowe | ..................... | G06F 21/00 726/7 |

FOREIGN PATENT DOCUMENTS

| | | |
|---|---|---|
| JP | 2013-149238 | 8/2013 |
| JP | 2016-085638 | 5/2016 |

\* cited by examiner

*Primary Examiner* — Ponnoreay Pich
(74) *Attorney, Agent, or Firm* — JCIPRNET

(57) ABSTRACT

An information processing apparatus is provided. Assume that a user has signed into a first cloud service of operation source. In a case where the user signs in to a second cloud service of operation destination, and in a case where an account registered in the second cloud service is permitted to be cooperated with another account, the information processing apparatus allows the user to sign in to the second cloud service.

8 Claims, 14 Drawing Sheets

FIG. 8

| MAPPING ID | COOPERATION SOURCE SERVICE ID | COOPERATION SOURCE ACCOUNT INFORMATION | COOPERATION DESTINATION SERVICE ID | COOPERATION DESTINATION ACCOUNT INFORMATION |
|---|---|---|---|---|
| | | | | |

FIG. 9

| COOPERATION SOURCE SERVICE ID (910) | COOPERATION SOURCE ACCOUNT INFORMATION (920) | COOPERATION DESTINATION ID (930) | CONTROL FLAG (940) |
|---|---|---|---|
| 1 | aaa@example.com | 1 | PERMISSION |
| 2 | bbb@example.com | 2 | PERMISSION |
| 1 | ccc@example.com | 3 | BAN |
| 1 | aaa@example.com | 2 | PERMISSION |

| ACCOUNT ID (1010) | MAIL ADDRESS (1020) | LAST NAME (1030) | NAME (1040) | ... |
|---|---|---|---|---|
| 1 | bbbbb@example.com | bb | bbb | ... |
| 2 | ccccc@publicprint.net | ccc | cc | ... |
| 3 | kinshi@example2.com | kin | shi | ... |

| SERVICE ID (1110) | SERVICE NAME (1120) |
|---|---|
| 1 | bbb |
| 2 | eeeeeee |

| COOPERATION SOURCE SERVICE ID (1310) | COOPERATION SOURCE ACCOUNT INFORMATION (1320) | SSO AUTHENTICATION PERMISSION TARGET (1330) | LOCAL AUTHENTICATION PERMISSION TARGET (1340) |
|---|---|---|---|
| 1 | aaa@example.com | NULL | 1, 2, 3 |
| 2 | ANY | 1 | NULL |
| 1 | ccc@example.com | NULL | NULL |

| TENANT ID (1410) | SSO AUTHENTICATION COOPERATION AVAILABILITY (1420) | LOCAL AUTHENTICATION COOPERATION AVAILABILITY (1430) |
|---|---|---|
| 1 | TRUE | FALSE |
| 2 | FALSE | TRUE |
| 3 | TRUE | TRUE |
| 4 | FALSE | FALSE |

| USER ID (1510) | COOPERATION AVAILABILITY (1520) |
|---|---|
| 1 | TRUE |
| 2 | TRUE |
| 3 | FALSE |
| 4 | FALSE |

1500

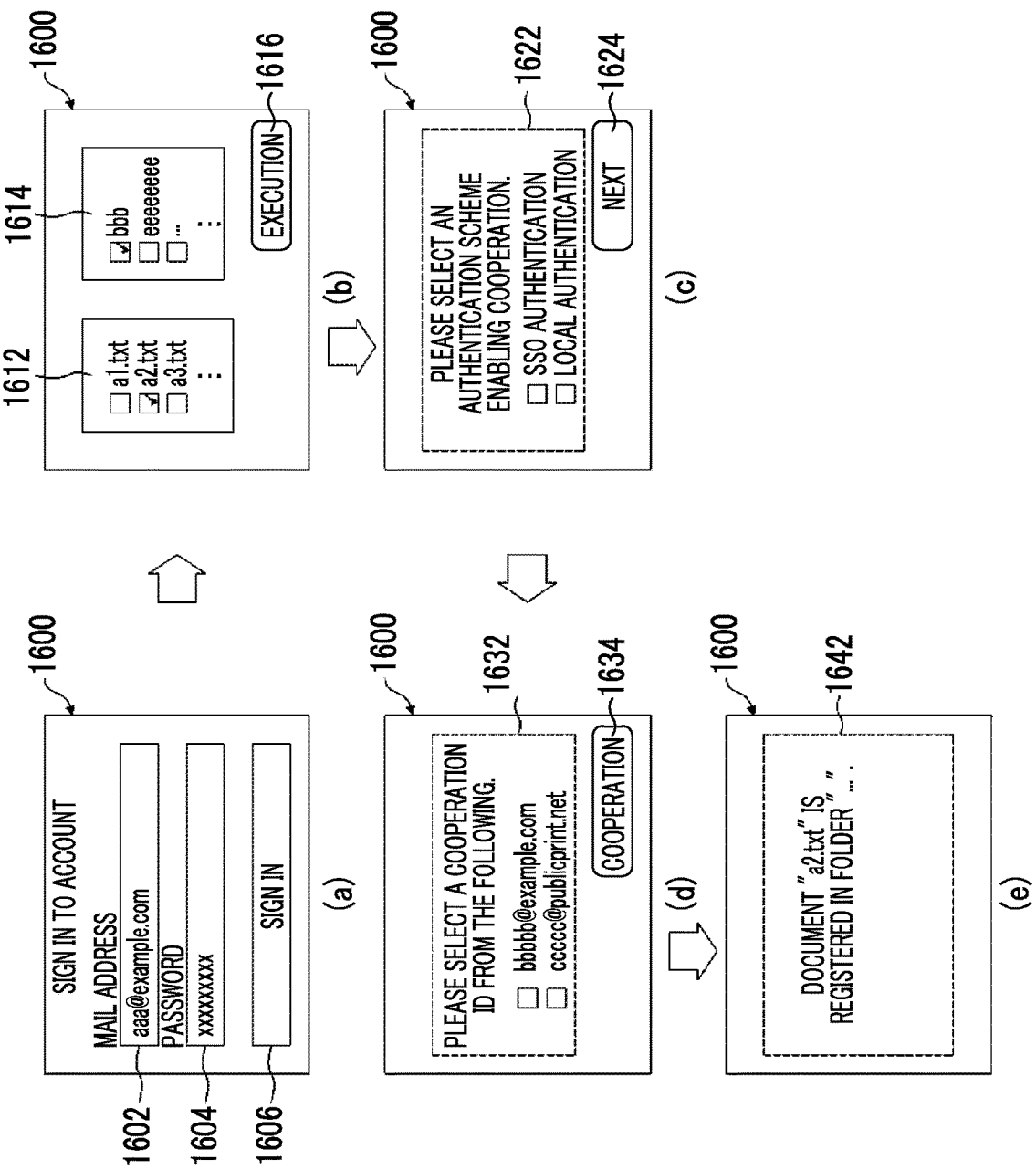

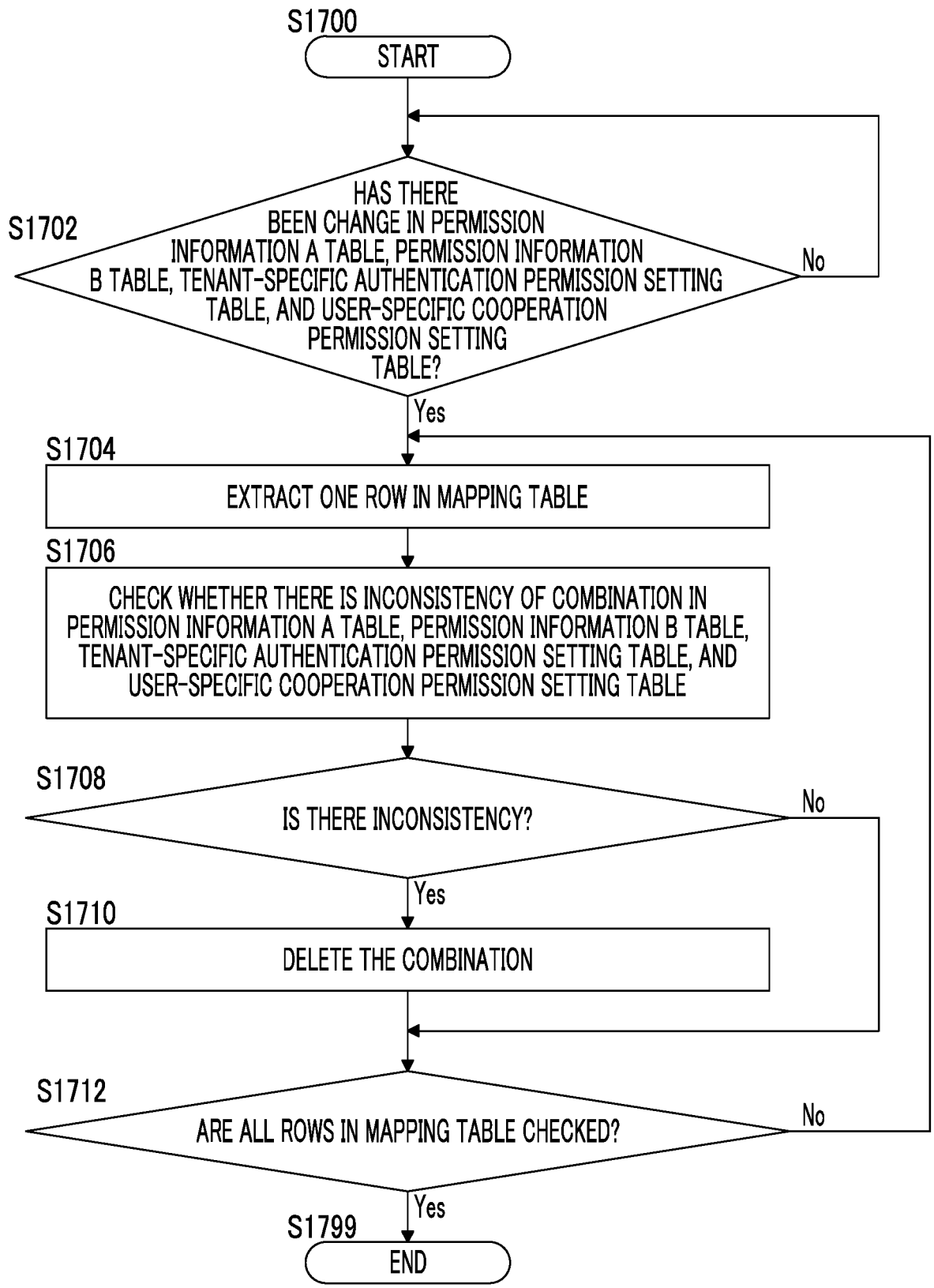

INFORMATION PROCESSING APPARATUS AND NON-TRANSITORY COMPUTER READABLE MEDIUM STORING INFORMATION PROCESSING PROGRAM FOR SINGLE SIGN-ON

CROSS-REFERENCE TO RELATED APPLICATIONS

This application is based on and claims priority under 35 USC 119 from Japanese Patent Application No. 2017-035168 filed Feb. 27, 2017.

BACKGROUND

Technical Field

The present invention relates to an information processing apparatus and a non-transitory computer readable medium storing an information processing program.

SUMMARY

According to an aspect of the invention, an information processing apparatus is provided. Assume that a user has signed into a first cloud service of operation source. In a case where the user signs in to a second cloud service of operation destination, and in a case where an account registered in the second cloud service is permitted to be cooperated with another account, the information processing apparatus allows the user to sign in to the second cloud service.

BRIEF DESCRIPTION OF THE DRAWINGS

Exemplary embodiment(s) of the present invention will be described in detail based on the following figures, wherein:

FIG. 8 is an explanatory diagram showing an example of a data structure of a mapping table;

FIG. 9 is an explanatory diagram showing an example of a data structure of a permission information A table;

FIG. 10 is an explanatory diagram showing an example of a data structure of an account information table;

FIG. 11 is an explanatory diagram showing an example of a data structure of a cooperation service type table;

FIG. 13 is an explanatory diagram showing an example of a data structure of a permission information B table;

FIG. 14 is an explanatory diagram showing an example of a data structure of a tenant-specific authentication permission setting table;

FIG. 15 is an explanatory diagram showing an example of a data structure of a user-specific cooperation permission setting table;

FIG. 16 is an explanatory diagram showing the processing example according to the exemplary embodiment;

FIG. 17 is a flowchart showing the processing example according to the exemplary embodiment.

DETAILED DESCRIPTION

An exemplary embodiment of the invention will be described below with reference to the accompanying drawings.

Figure 1:
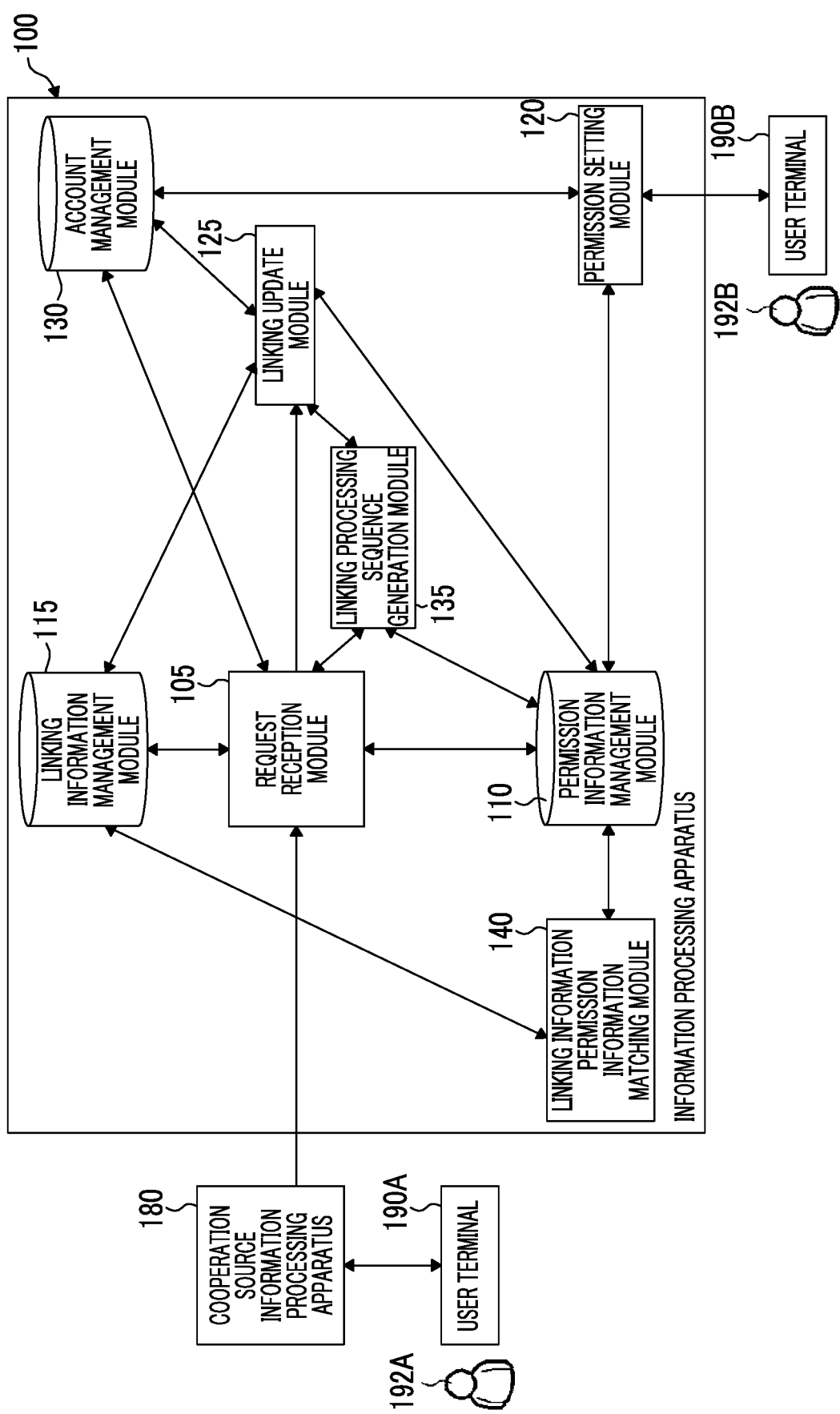
FIG. 1 is a conceptual module configuration diagram of a configuration example of an exemplary embodiment.

FIG. 1 shows a conceptual module configuration diagram of a configuration example of the exemplary embodiment.

The term "module" generally refers to a component such as software (computer program) or hardware, which can be logically separated. Accordingly, the module in the exemplary embodiment refers not only to a module in a computer program but also a module in a hardware configuration. Therefore, in the exemplary embodiment, a description will be made about computer programs causing a computer to function as the modules (a program causing a computer to execute respective procedures, a program causing a computer to function as respective units, and a program causing a computer to implement each function), a system, and a method. However, for the sake of convenience of explanation, the words "storing", "causing to store", and the equivalent wording are used, but these wordings mean that storing in a storage device or controlling so as to store in a storage device, in a case where the exemplary embodiment is a computer program. In addition, although modules may correspond one-to-one to functions, in implementation, one module may be configured with one program, or plural modules may be configured with one program, and conversely, one module may be configured with plural programs. Further, plural modules may be executed by one computer, or one module may be executed by plural computers, by a computer in a distributed or parallel environment. Note that one module may include another module. Hereinafter, "connection" is also used in the case of a logical connection (data transfer, instruction, reference relation between data, or the like), in addition to physical connection. "Predetermined" means that it is determined before a targeted process, and is used including a meaning that it is determined of course before a process according to the exemplary embodiment starts, or depending on the situation and state at that time or depending on the situation and state until that time before a targeted process starts even after a process according to the exemplary embodiment starts. In the case where there are plural "predetermined values", the values may be different from each other, or at least two values among them may be the same as each other (including all the values, of course). In addition, the statement "to perform B in a case of A" is used to mean "to determine whether it is A or not, and B is used in a case where it is determined to be A". However, excluded are cases where it is unnecessary to determine whether it is A or not. Further, unless otherwise noted, a case of enumerating things like "A, B, and C" is an example of enumeration, and includes cases where only one of them is selected (for example, A only).

Further, a system or an apparatus includes a configuration in which plural computers, hardware, apparatuses, and the like are connected by a communication unit such as a network (including one-to-one correspondence communication connection), as well as a configuration implemented by a single computer, hardware, apparatus, or the like. "Apparatus" and "system" are used synonymously with each other. Of course, the "system" does not include things that are merely a social "mechanism" (social system) which is an artificial arrangement.

Further, for each process by each module or for each process in a case where plural processes are performed in the module, target information is read from the storage device, the process is performed, and then the process result is written in the storage device. Therefore, a description about reading from the storage device before processing and writing to the storage device after the processing may be omitted in some cases. Note that the storage device here may include a hard disk, a random access memory (RAM), an external storage medium, a storage device through a communication line, a register in a central processing unit (CPU), or the like.

An information processing apparatus 100 according to the exemplary embodiment cooperates plural cloud services, and as illustrated in an example of FIG. 1, it includes a request reception module 105, a permission information management module 110, a linking information management module 115, a permission setting module 120, a linking update module 125, an account management module 130, a linking processing sequence generation module 135, and a linking information permission information matching module 140. The information processing apparatus 100 is included in a cloud service of cooperation destination. The process is performed in response to the cooperation request from the cooperation source information processing apparatus 180.

For example, it is assumed that there is an account which is already used by plural people belonging to the organization, such as an account allocated to the organization. In other words, it can be said that the accounts are permitted to be cooperable with other accounts (as a typical example, users belonging to the organization). However, even if accounts of such organizations are registered in the cloud service of cooperation destination, the accounts are not used in the single sign-on technique.

As a typical example of using the information processing apparatus 100, in a case where a cloud service X can be used by an account A of the organization, in a case of situation where the account B of the user (individual) belonging to the organization is registered in a cloud service Y, but is not registered in the cloud service X, the same exemplary embodiment is used. Under this situation, by cooperating the account A and the account B, the user can use the cloud service X with the account B. The user knows the password, or the like of the account A so that the user can log in with the account A.

The request reception module 105 is connected to the permission information management module 110, the linking information management module 115, the linking update module 125, the account management module 130, the linking processing sequence generation module 135, and the cooperation source information processing apparatus 180. The request reception module 105 receives a cooperation request (cooperation source request) from the cooperation source information processing apparatus 180, and requests the sign-in operation of the user 192A through the cooperation source information processing apparatus 180. Assume that a user 192A has signed in to a first cloud service of operation source. In a case where the user 192A, signs in to a second cloud service of cooperation destination, and in a case where an account registered in the second cloud service is permitted to be cooperated with another account, the user 192A is allowed to sign in to the second cloud service.

The permission information management module 110 is connected to the request reception module 105, permission setting module 120, the linking update module 125, the linking processing sequence generation module 135, and the linking information permission information matching module 140. The permission information management module 110 stores an account in a cloud service and an organization subject to cooperation permission for each authentication scheme in association with each other. That is, the information set by the permission setting module 120 is managed. For example, a permission information B table 1300 shown in FIG. 13 to be described later is stored.

The linking information management module 115 is connected to the request reception module 105, the linking update module 125, and the linking information permission information matching module 140. The linking information management module 115 stores information on association between users for performing a single sign-on process. For example, the mapping table 800 shown in FIG. 8 to be described later is stored.

The permission setting module 120 is connected to the permission information management module 110, the account management module 130, and a user terminal 190B. The permission setting module 120 performs the cooperation permission setting for the existing user of the second cloud service of cooperation destination, according to the operation of the administrator 192B through the user terminal 190B.

The linking update module 125 is connected to the request reception module 105, the permission information management module 110, the linking information management module 115, the account management module 130, and the linking processing sequence generation module 135. The linking update module 125 performs a process to be executed when authentication cannot be completed only by referring to the linking information management module 115 by the request reception module 105. Specifically, based on the permission information in the permission information management module 110, the user 192A is requested to perform a sign-in operation necessary for association between users, and the linking information management module 115 is updated using a response to the request. At that time, the account management module 130 may be referred to as necessary.

The linking update module 125 performs an extraction process A for extracting from the permission information management module 110, an organization subject to permission corresponding to the account of the user 192A who has signed in to the first cloud service of cooperation source in which the cooperation source information processing apparatus 180 is included, through the user terminal 190A. Here, the "organization" is a mechanism constructed by plural users, for example, a company, a department, a tenant, a group, or the like (hereinafter exemplified using a tenant).

Then, the linking update module 125 performs an extraction process B for extracting from the account management module 130, information indicating whether or not permission is possible for each authentication scheme corresponding to the organization subject to permission.

Then, the linking update module 125 performs an extraction process C for extracting from the account management module 130, information indicating whether or not an account of an organization for which permission is possible for each authentication scheme is cooperable with another account.

Next, the linking update module 125 controls the request reception module 105 and performs a sign-in control process for allowing the user 192A to perform an operation of signing into the second cloud service of cooperation destination, in a case of extracting the information indicating that cooperation is possible by the extraction process C.

In addition, in a case where the user 192A signs in to the second cloud service by the sign-in control process, the linking update module 125 may perform an associating process for associating the account of the user 192A with the account of the organization and storing the accounts in the linking information management module 115. For example, the mapping table 800 shown in FIG. 8 to be described later is stored in the linking information management module 115.

In addition, in a case where the account of the user 192A who intends to sign in to the first cloud service is associated and stored by the association process, the linking update module 125 controls the request reception module 105 such that the user may be permitted to sign in to the second cloud service.

The account management module 130 is connected to the request reception module 105, the permission setting module 120, and the linking update module 125. The account management module 130 stores the organization and the information indicating whether or not cooperation can be permitted for each authentication scheme in association with each other. For example, the tenant-specific authentication permission setting table 1400 shown in FIG. 14 to be described later is stored. Further, the account management module 130 stores an account and information indicating whether the account is cooperable with another account in association with each other. For example, a user-specific cooperation permission setting table 1500 shown in FIG. 15 to be described later is stored. That is, the account management module 130 manages further detailed information, with respect to the information in the permission information management module 110 and the linking information management module 115. Therefore, in a case where more detailed information is required than the permission information management module 110 and the linking information management module 115, the account management module 130 is referred to.

The linking processing sequence generation module 135 is connected to the request reception module 105, the permission information management module 110, and the linking update module 125. The linking processing sequence generation module 135 converts the processing sequence to a graphical user interface (GUI) in order to provide the user terminal 190A with a sign-in operation in user association by the linking update module 125.

The linking information permission information matching module 140 is connected to the permission information management module 110, and the linking information management module 115. The linking information permission information matching module 140 corrects the deviation between "association information" in the linking information management module 115 with the lapse of time and "permission information" in the permission information management module 110 or the account management module 130 at an appropriate frequency.

The linking information permission information matching module 140 performs maintenance by eliminating inconsistency between the account set which is associated through an association process by the linking update module 125 and stored in the linking information management module 115 and any one or more of the permission information management module 110 (for example, the permission information B table 1300) and the account management module 130 (for example, the tenant-specific authentication permission setting table 1400, and the user-specific cooperation permission setting table 1500).

Further, the linking information permission information matching module 140 may perform a control process of performing a control the extraction process A of the linking update module 125, in a case where the account of the user 192A who intends to sign in to the first cloud service is not cooperated with the account which is registered in the first cloud service.

Further, the linking information permission information matching module 140 may perform control so as to perform the control process, in a case where the account of the user 192A who intends to sign in to the first cloud service is not registered in the second cloud service.

The cooperation source information processing apparatus 180 is connected to the request reception module 105 of the information processing apparatus 100 and the user terminal 190A. The cooperation source information processing apparatus 180 is included in the cloud service of cooperation source. The cooperation source information processing apparatus 180 makes a cooperation request to the information processing apparatus 100 by the operation of the user 192A on the user terminal 190A. Further, in the cooperation source information processing apparatus 180, a sign-in operation request is issued to user 192A (the user terminal 190A) in response to a sign-in request from the information processing apparatus 100. The user 192A performs a sign-in operation on the information processing apparatus 100 through the user terminal 190A and the cooperation source information processing apparatus 180.

The user terminal 190A is operated by the user 192A, and is connected to the cooperation source information processing apparatus 180. The user terminal 190A is a personal computer (including a notebook PC), a portable information terminal, an information processing apparatus 250 to be described later, or the like, and makes a request for processing to a first cloud service including the cooperation source information processing apparatus 180, and a second cloud service including the information processing apparatus 100, according to the operation of the user 192A.

The user terminal 190B is operated by the administrator 192B, and is connected to the permission setting module 120 of the information processing apparatus 100. According to the operation of the administrator 192B, the user terminal 190B makes an instruction to manage accounts or the like of the organization registered in the second cloud service.

Figure 2:
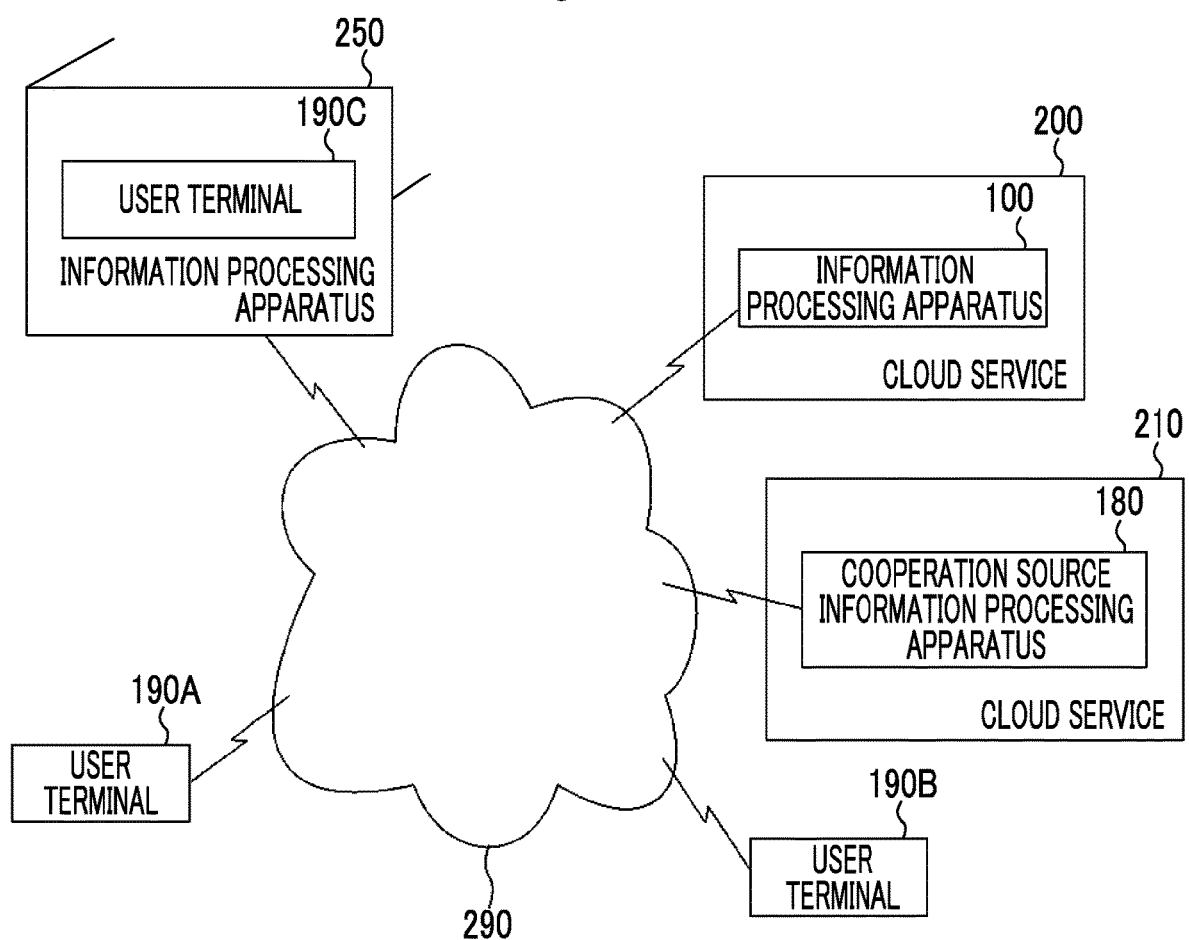
FIG. 2 is an explanatory diagram showing a system configuration example using the exemplary embodiment.

FIG. 2 is an explanatory diagram showing a system configuration example using the exemplary embodiment.

A cloud service 200 includes an information processing apparatus 100. A cloud service 210 includes a cooperation source information processing apparatus 180. A information processing apparatus 250 includes a user terminal 190C. A user interface as the user terminal 190C is provided using the touch panel of the information processing apparatus 250 or the like.

The information processing apparatus 100 in the cloud service 200, the cooperation source information processing apparatus 180 in the cloud service 210, the user terminal 190A, the user terminal 190B, and the information processing apparatus 250 are connected through the communication line 290. The communication line 290 may be wireless, wired, or a combination thereof, and may be, for example, the Internet as an infrastructure for communications, an intranet, or the like.

Plural cloud services 200 and cloud services 210 may be provided respectively, or the relationship between cooperation destination and cooperation source may be reversed. That is, there may be an information processing apparatus 100 in the cloud service 210 and a cooperation source information processing apparatus 180 in the cloud service 200. Of course, both cloud service 200 and cloud service 210 may have both information processing apparatus 100 and cooperation source information processing apparatus 180, respectively.

The user 192A signs in to the cloud service 210 by using the user terminal 190A, the information processing apparatus 250, or the like, and receives the cloud service provided from the cloud service 210. Then, it receives cloud service provided from the cloud service 200 using a single sign-on technique. In addition, in a case where the single sign-on technique cannot be used (in a case where an account is not associated in the information processing apparatus 100), by the information processing apparatus 100, association with the account already registered in the cloud service 200 is performed, and it is not necessary to newly perform a register process with the cloud service 200, and it is possible to receive a cloud service provided from the cloud service 200.

Figure 3:
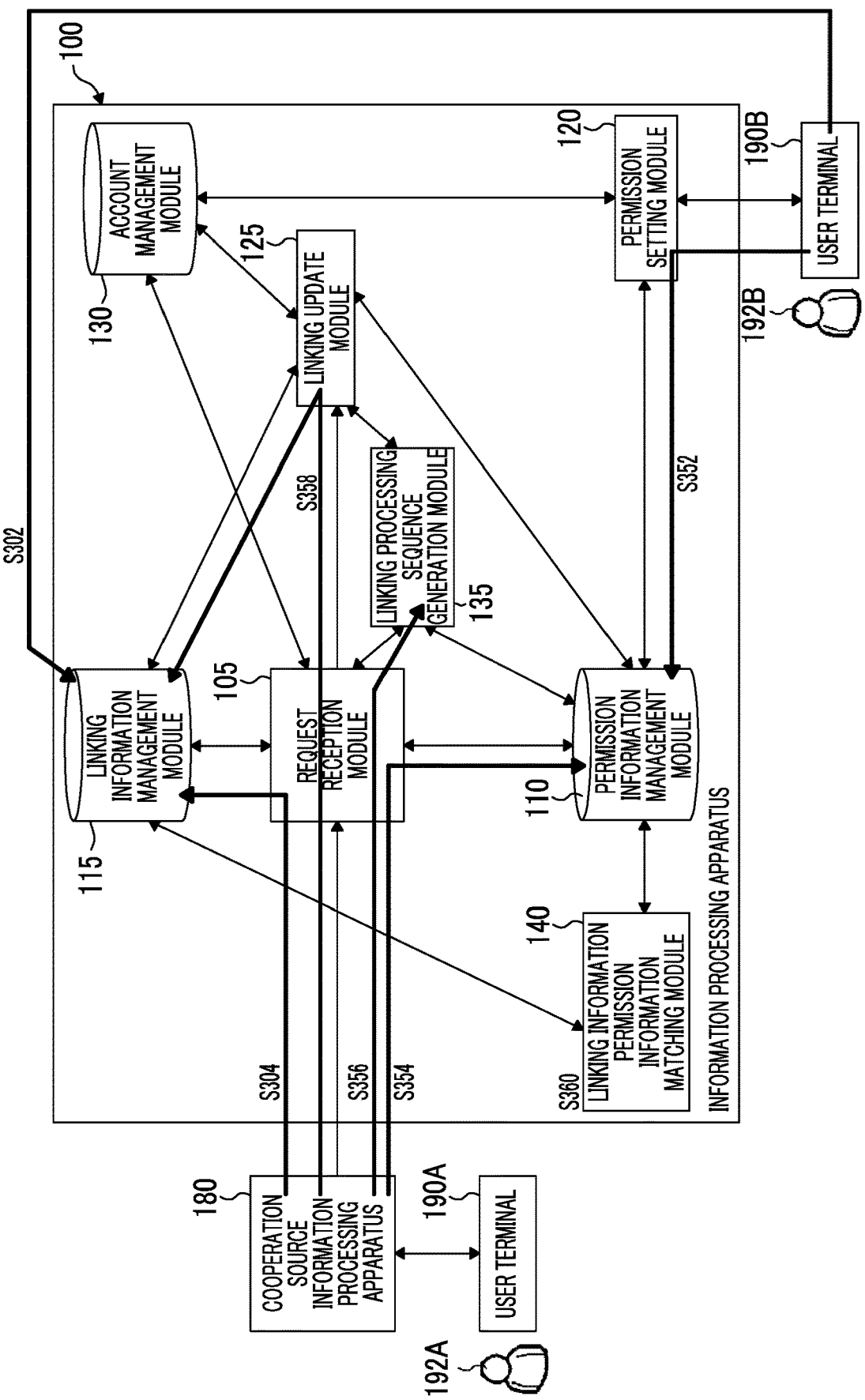
FIG. 3 is an explanatory diagram showing a processing example according to the exemplary embodiment.

FIG. 3 is an explanatory diagram showing the processing example (outline) according to the exemplary embodiment.

The process from step S302 to step S304 represent a process in a case where single sign-on is possible, and the process from step S352 to step S358 represents a process in a case where single sign-on cannot be performed (association information Is not present in the linking information management module 115).

In step S302, the mapping table 800 is generated in the linking information management module 115 through the user terminal 190B by the operation of the administrator 192B. That is, in step S302, the mapping table 800 is set and updated directly.

In step S304, the cooperation source information processing apparatus 180, the request reception module 105, and the linking information management module 115 are used in order. In step S304, the request reception module 105 performs authentication determination as to the user 192A only based on whether there is an association in the mapping table 800 in the linking information management module 115. This is a general single sign-on process.

In step S352, the permission setting module 120 and the permission information management module 110 are used in order through the user terminal 190B by the operation of the administrator 192B. In step S352, the mapping table 800 in the linking information management module 115 is not directly set and updated, but instead thereof, a permission information B table 1300 in the permission information management module 110 is set.

In step S354, the cooperation source information processing apparatus 180, the request reception module 105, and the permission information management module 110 are used in order. In step S354, if there is no information associated with the account of the user 192A in the mapping table 800 in the linking information management module 115, the permission information B table 1300 in the permission information management module 110 is referred to.

In step S356, the cooperation source information processing apparatus 180, the request reception module 105, and the linking processing sequence generation module 135 are used in order. In step S356, a corresponding UI is generated according to each type of the authentication scheme, and display control of the sign-in request is performed for the user 192A.

In step S358, the cooperation source information processing apparatus 180, the request reception module 105, the linking update module 125, and the linking information management module 115 are used in order. In step S358, as the result of the process in step S356 (indirect operation of the user 192A), the mapping table 800 in the linking information management module 115 is updated.

In step S360, in a case where a deviation occurs due to lapse of time in the mapping table 800 in the linking information management module 115 and the permission information B table 1300 in the permission information management module 110, they are modified at an appropriate timing.

Figure 4:
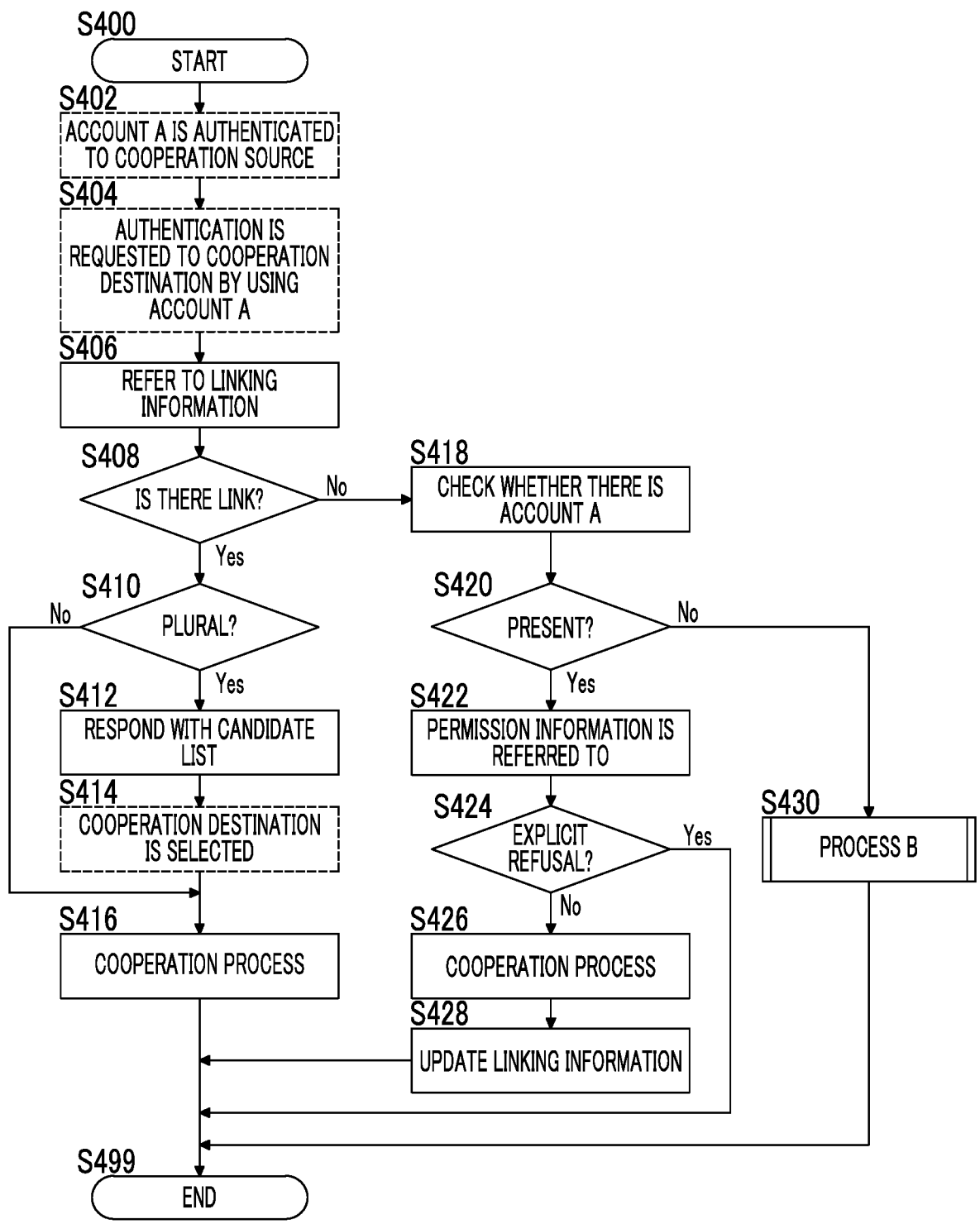
FIG. 4 is a flowchart showing a processing example according to the exemplary embodiment.

FIG. 4 is a flowchart showing the processing example according to the exemplary embodiment. This is a processing example in a case where there is the same account in the cloud service of cooperation destination. The steps enclosed by the dotted lines are processes to be performed according to the operation of the user.

The process is as follows.

(A1) It is determined whether the account of the cloud service of a cooperation request source is present in the mapping table 800 of the cloud service of cooperation destination.

(A2) If it is not in the mapping table 800, it is checked whether a similar account is present in the cloud service of cooperation destination.

(A3) Only in a case where it is checked in (A2) that it is present, after checking that there is no explicit refusal setting just in case, it is responded with cooperation permission and the mapping table 800 is updated.

Figure 5:
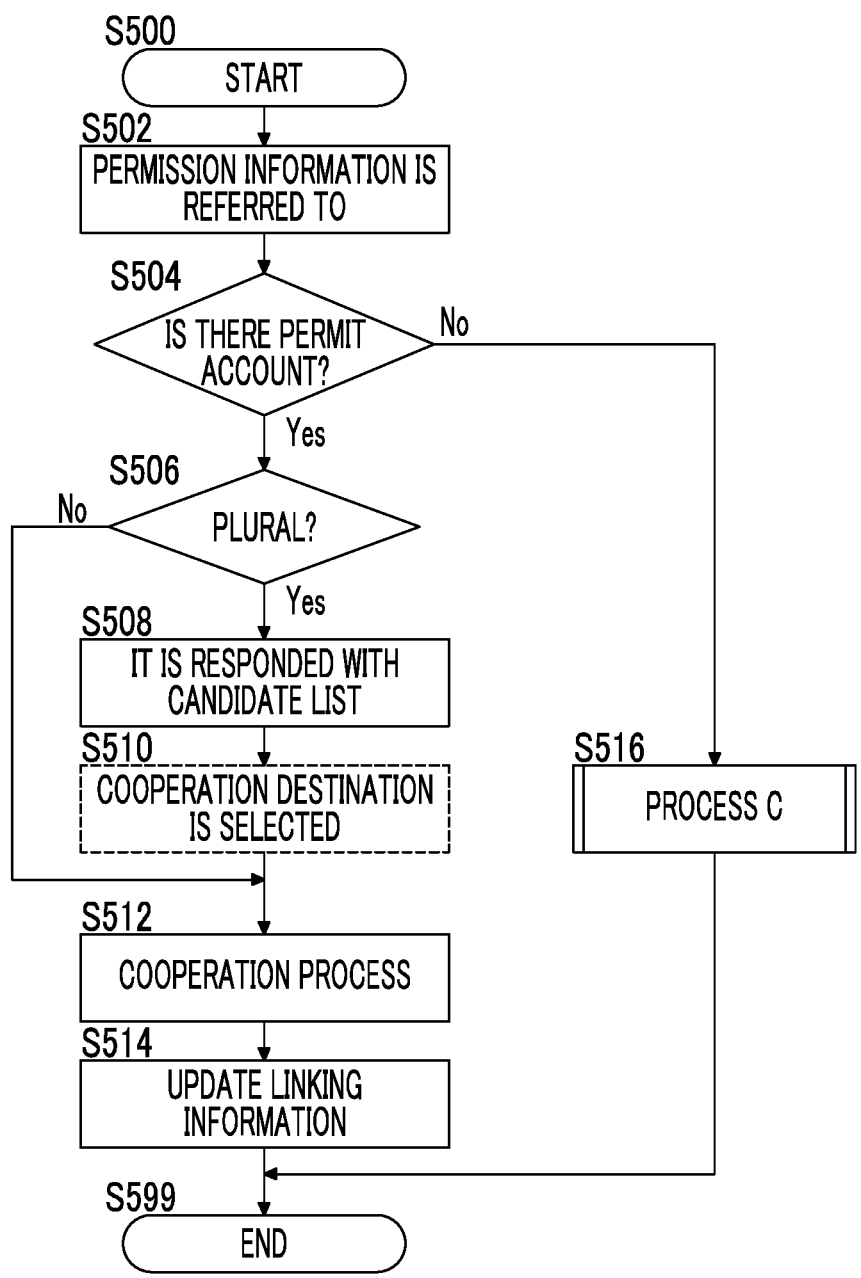
FIG. 5 is a flowchart showing the processing example according to the exemplary embodiment.

(A4) The process in a case where it is checked that it is not present in (A2), the process proceeds to the processing example according to the flowchart shown in the example of FIG. 5.

The following processes may be provided as an option.

(A5) In a case where plural associations have already been registered in the mapping table 800, a selection candidate list is presented to the cloud service (user) of cooperation source, and it is on standby for a response. Here, as the selection candidate list, a security process on the display (for example, making a part of an account name or the like an upside-down type symbol) may be performed.

(A6) When receiving the selection result from the selection candidate list, it is responded with cooperation permission thereto.

A detailed process will be described below.

In step S402, the account A is authenticated to the cloud service of cooperation source.

In step S404, authentication is requested to the cloud service of cooperation destination by using account A.

In step S406, linking information (the mapping table 800) is referred to.

In step S408, it is determined whether there is a link (the account A in the mapping table 800). In a case where there is a link, the process proceeds to step S410; otherwise, the process proceeds to step S418.

In step S410, it is determined whether or not there are plural links. In a case where there are plural links, the process proceeds to step S412; otherwise, the process proceeds to step S416.

In step S412, a list of the plural candidates (the selection candidate list) is responded to the cloud service (user) of cooperation source.

In step S414, cooperation destination is selected according to the operation of a user.

In step S416, a cooperation process is performed. That is, a single sign-on process is performed.

In step S418, it is checked whether the account A already exists in the cloud service of cooperation destination.

In step S420, it is determined whether there is the account A. If there is the account A, the process proceeds to step S422; otherwise, the process proceeds to step S430.

In step S422, permission information (a permission information B table 1300 in the permission information management module 110, a user-specific cooperation permission setting table 1500 in the account management module 130, or the like) is referred to. In this case, it is checked whether to associate itself (to associate the account A in the cloud service of cooperation source and the account A in the cloud service of cooperation destination).

In step S424, it is determined whether or not in the permission information indicates an explicit refusal relating to the association of the account A. In the case of the explicit refusal, the process is ended (step S499); otherwise, the process proceeds to step S426. The case where the cooperation availability field 1520 of the user-specific cooperation permission setting table 1500 in the account management module 130 is "FALSE" corresponds to explicit refusal.

In step S426, a cooperation process is performed. That is, the same process as the single sign-on process is performed.

In step S428, linking information is updated. That is, an association is added to the mapping table 800 in the linking information management module 115.

In step S430, a process B is performed. A detailed process at step S430 will be described later with reference to the flowchart shown in the example of FIG. 5.

FIG. 5 is a flowchart showing the processing example according to the exemplary embodiment.

The process is as follows.

(B1) It is checked whether the cooperation request source account is present in the permission information (the permission information A table 900 in the permission information management module 110).

(B2) In a case where it is checked in (B1) that it is present, it is responded with cooperation permission depending on the permission attribute (for example, which account of the cloud service of cooperation destination is to be permitted, what cooperation source the cloud service is to be permitted, or the like), and the mapping table 800 in the linking information management module 115 is updated. Here, minimum information necessary for permission information may be retained, and detailed information may be acquired as necessary from another table (the account information table 1000 shown in the example of FIG. 10, or the like) based on an account.

Figure 6:
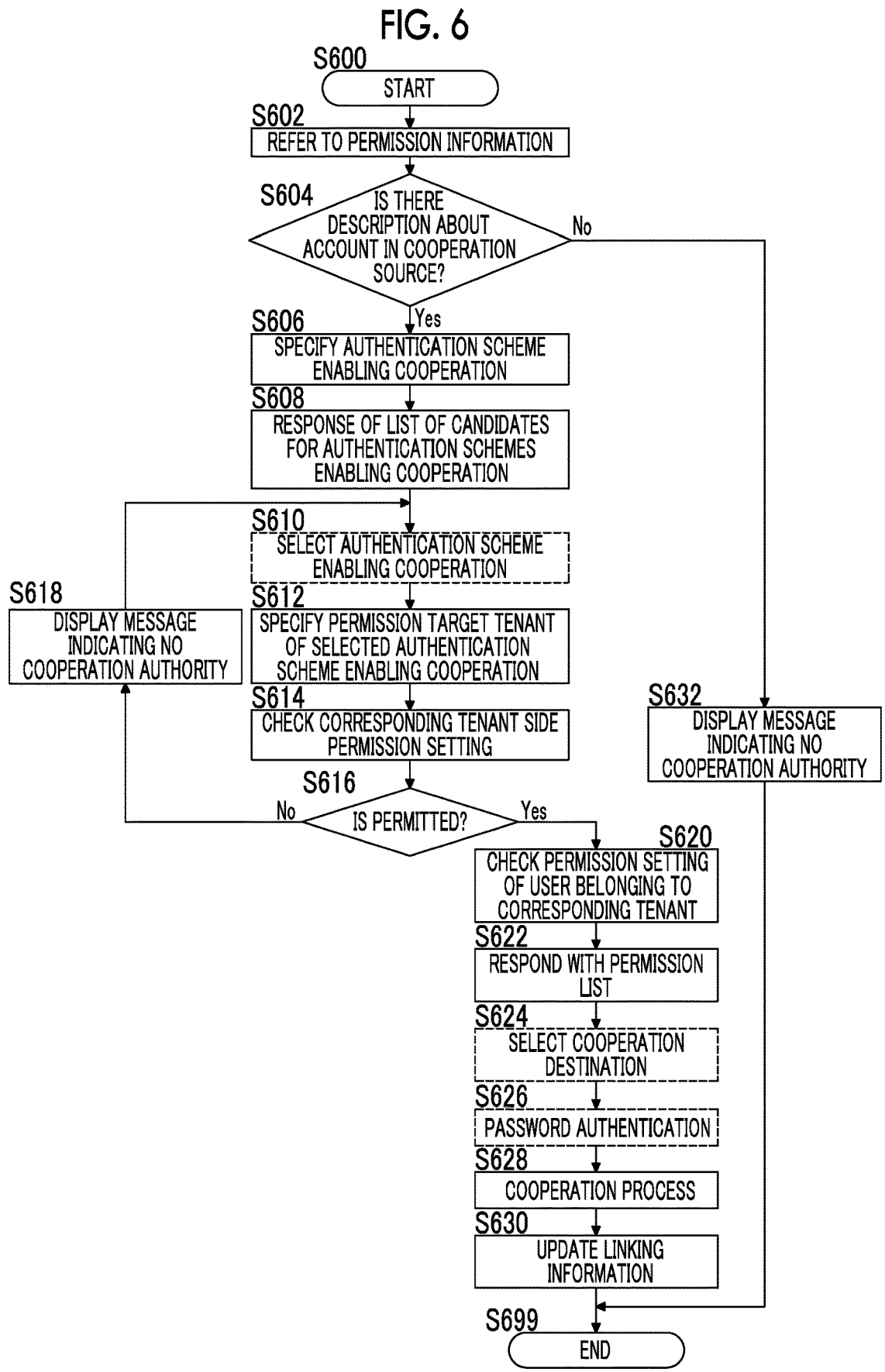
FIG. 6 is a flowchart showing the processing example according to the exemplary embodiment.

(B3) In a case where it is checked in (B1) that it is not present, the process proceeds to the processing example according to the flowchart shown in the example of FIG. 6.

The following processes may be provided as an option.

(B4) In a case where there are plural corresponding accounts explicitly, with reference to the permission information, the selection candidate list is presented to the cloud service (user) of cooperation source and it waits for a response.

(B5) When receiving the selection result from the selection candidate list, it is responded with cooperation permission thereto. Then, the linking information (the mapping table 800) is updated. In the processing example shown in FIG. 5, since the account in the cloud service of cooperation destination is explicitly permitted, an authentication process by password input or the like is not indispensable, but the authentication process may be added from the security viewpoint.

A detailed process will be described below.

In step S502, permission information (a permission information A table 900 in the permission information management module 110) is referred to.

In step S504, it is determined whether or not there is a permit account. If there is a permit account, the process proceeds to step S506; otherwise, the process proceeds to step S516.

In step S506, it is determined whether or not there are plural permit accounts. If there are plural permit accounts, the process proceeds to step S508; otherwise, the process proceeds to step S512.

In step S508, a list of the plural candidates is responded to the cloud service (user) of cooperation source.

In step S510, cooperation destination is selected according to the operation of a user.

In step S512, a cooperation process is performed. That is, the same process as the single sign-on process is performed.

In step S514, linking information is updated. That is, an association is added to the mapping table 800 in the linking information management module 115.

In step S516, a process C is performed. A detailed process at step S516 will be described later with reference to the flowchart shown in the example of FIG. 6.

FIG. 6 is a flowchart showing the processing example according to the exemplary embodiment.

The process is as follows.

(C1) It is checked whether or not there is a setting permitting an account in the cloud service of the cooperation request source, with reference to permission information (a permission information B table 1300 in the permission information management module 110). For example, the setting in the first row and the second row in the permission information B table 1300 shown in FIG. 13 corresponds to cooperation permission to "aaa@example.com".

(C2) If there is a corresponding permission setting, the following association process is performed in a stepwise manner, according to the attribute to be set.

(C3) For example, in a case of permitting plural authentication schemes, first, the candidate list (for example, a part (c) in FIG. 16) is returned to the cloud service (user) of the cooperation request source, and the authentication scheme is selected.

(C4) With respect to the authentication scheme selected by the cloud service (user) of the cooperation request source, first, a tenant is specified for whom the authentication scheme is permitted in the "tenant-specific permit setting" (for example, the tenant-specific authentication permission setting table 1400 shown in FIG. 14). Since the setting is not dedicated to cooperation, but it is a service-specific function, it takes precedence over permission information. In other words, when setting cooperation permission, it is not necessary to refer to "tenant-specific permission setting".

(C5) For the user belonging to the tenant which is further permitted, "setting of cooperation permission" (for example, a user-specific cooperation permission setting table 1500 shown in FIG. 15). Since the setting of permission information is not necessarily performed by the corresponding user, the user-specific cooperation permission here takes precedence over the permission information setting.

(C6) The list of extracted cooperation permitted users is returned to the cloud service (user) of the cooperation request source, and a cooperation destination account is selected.

(C7) Since it is not an explicit permission, unlike the processing examples shown in the examples of FIG. 4 or FIG. 5, before performing an association process, a request for authentication using the password is made to the cloud service (user) of cooperation source, with respect to the account in the cloud service of cooperation destination selected by the cloud service (user) of cooperation source.

(C8) Only in a case where authentication by (C7) is passed, it is responded with cooperation permission and the mapping table 800 is updated.

A detailed process will be described below.

In step S602, permission information (a permission information B table 1300 in the permission information management module 110) is referred to.

In step S604, it is determined whether or not there is a description about an account in the cloud service of cooperation source. If there is a description, the process proceeds to step S606; otherwise, the process proceeds to step S632.

In step S606, the authentication scheme that enables cooperation is specified.

In step S608, a candidate list of authentication schemes that enables cooperation is responded to the cloud service (user) of cooperation source.

In step S610, an authentication scheme that enables cooperation is selected according to the operation of a user.

In step S612, a tenant subject to permission of the selected authentication scheme that enables cooperation is specified.

In step S614, the corresponding tenant side permission setting is checked.

In step S616, it is determined whether or not permission is made. If permission is made, the process proceeds to step S620; otherwise, the process proceeds to step S618.

In step S618, a message indicating "no cooperation authority" is displayed in the cloud service (user) of cooperation source, and the process returns to step S610.

In step S620, the permission setting of the user belonging to the corresponding tenant is checked.

In step S622, the permission list is responded to the cloud service (user) of cooperation source.

In step S624, cooperation destination is selected according to the operation of a user.

In step S626, the password is authenticated according to the operation of the user.

In step S628, a cooperation process is performed. That is, the same process as the single sign-on process is performed.

In step S630, linking information is updated. That is, an association is added to the mapping table 800 in the linking information management module 115.

In step S632, a message indicating "no cooperation authority" is displayed in the cloud service (user) of cooperation source.

Figure 7:
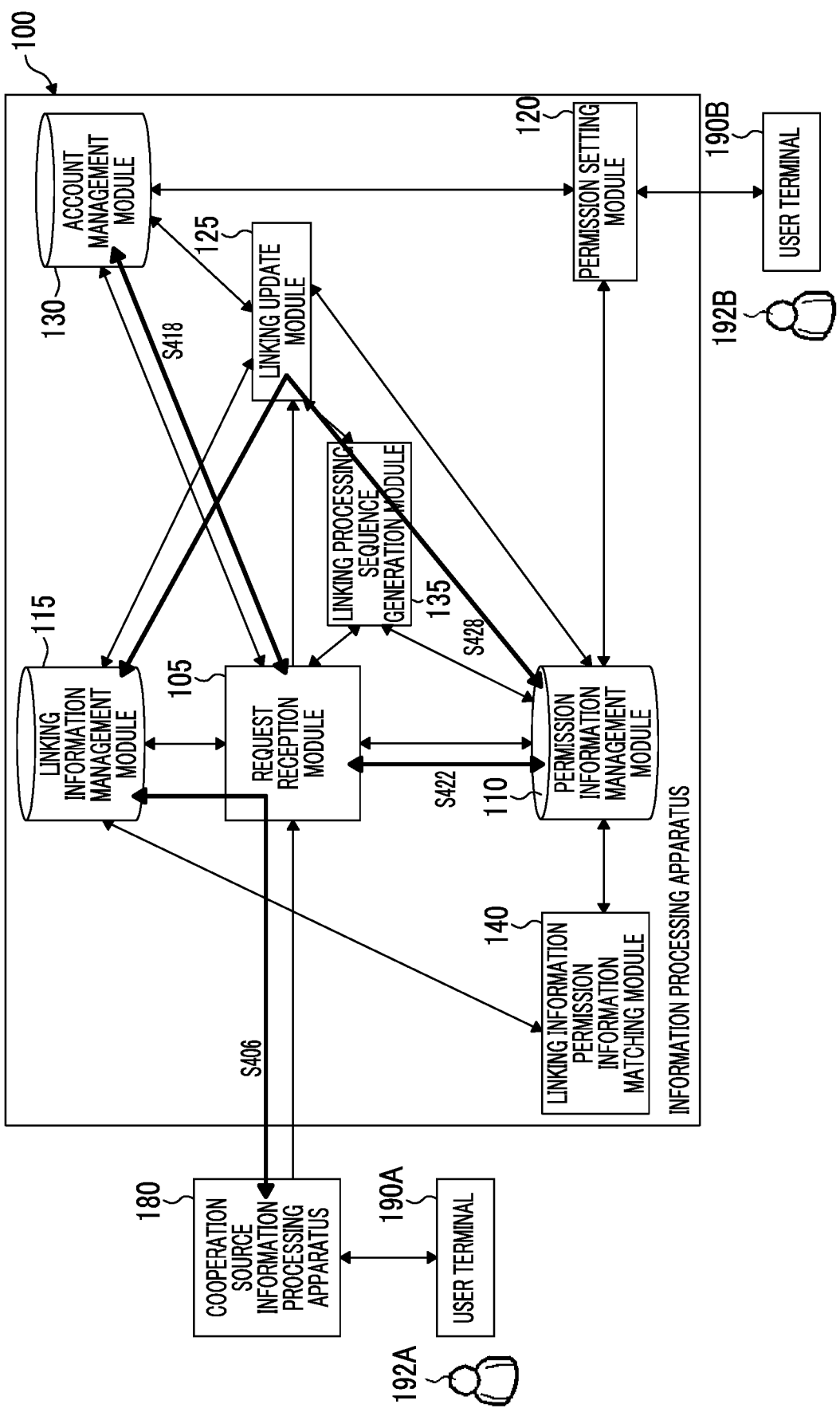
FIG. 7 is an explanatory diagram showing the processing example according to the exemplary embodiment.

FIG. 7 is an explanatory diagram showing the processing example according to the exemplary embodiment. It shows the relationship between the processing example by the flowchart shown in FIG. 4 and modules.

In step S406, the request reception module 105 processes the cooperation request from the cooperation source information processing apparatus 180 with reference to the linking information management module 115.

In step S418, the request reception module 105 refers to the account management module 130.

In step S422, the request reception module 105 refers to the permission information management module 110.

In step S428, the linking update module 125 refers to the permission information management module 110 and the linking information management module 115.

FIG. 8 is an explanatory diagram showing an example of a data structure of the mapping table 800. The mapping table 800 is stored in the linking information management module 115. The mapping table 800 includes a mapping ID field 810, a cooperation source service ID field 820, a cooperation source account information field 830, a cooperation destination service ID field 840, and a cooperation destination account information field 850. The mapping ID field 810 stores information (mapping ID: IDentification) for uniquely identifying the mapping (the account in the cloud service of cooperation source and the account in the cloud service of cooperation destination) in the exemplary embodiment. The cooperation source service ID field 820 stores information (cooperation source service ID) for uniquely identifying the cloud service of cooperation source in the exemplary embodiment. The cooperation source account information field 830 stores account information in the cloud service of cooperation source. The cooperation destination service ID field 840 stores information (a cooperation destination service ID) for uniquely identifying the cloud service of cooperation destination in the exemplary embodiment. The cooperation destination account information field 850 stores account information in the cloud service of cooperation destination.

That is, if the account is registered in the mapping table 800, a single sign-on process is performed.

The examples shown in FIG. 9 to FIG. 12 are used in the processing example of the flowchart shown in the example of FIG. 5.

FIG. 9 is an explanatory diagram showing an example of a data structure of the permission information A table 900. The permission information A table 900 is stored in the permission information management module 110.

The permission information A table 900 includes a cooperation source service ID field 910, a cooperation source account information field 920, a cooperation destination ID field 930, and a control flag field 940. The cooperation source service ID field 910 stores a cooperation source service ID. The cooperation source account information field 920 stores account information in the cloud service of cooperation source. The cooperation destination ID field 930 stores information (a cooperation destination ID) for uniquely identifying the account information in the cloud service of cooperation destination, in the exemplary embodiment. The specific content is stored in the account information table 1000. The control flag field 940 stores control flags indicating cooperation permission or cooperation prohibition.

That is, the permission information A table 900 indicates whether cooperation is permitted or prohibited for the account information in the cloud service of cooperation source, in the cloud service of cooperation destination. It is determined whether cooperation is permitted or not, with reference to the permission information A table 900. In a case where there is not in the permission information A table 900, the process shown in the example in FIG. 6 is performed.

FIG. 10 is an explanatory diagram showing an example of a data structure of the account information table 1000. The account information table 1000 is stored in the account management module 130. In a case where the information is insufficient in the permission information A table 900, the account information table 1000 is referred to.

The account information table 1000 includes an account ID field 1010, a mail address field 1020, a last name field 1030, and a name field 1040. The account ID field 1010 stores information (account ID) for uniquely identifying the account, in the exemplary embodiment. The mail address field 1020 stores the mail address of the user of the account. The last name field 1030 stores the last name of the user of the account. The name field 1040 stores the name of the user of the account.

FIG. 11 is an explanatory diagram showing an example of a data structure of the cooperation service type table 1100. The cooperation service type table 1100 is stored in the account management module 130. In a case where the information is insufficient in the permission information A table 900, the cooperation service type table 1100 is referred to.

The cooperation service type table 1100 includes a service ID field 1110 and a service name field 1120. The service ID field 1110 stores information (service ID) for uniquely identifying the cloud service, in the exemplary embodiment. The service name field 1120 stores the name of the cloud service.

Figure 12:
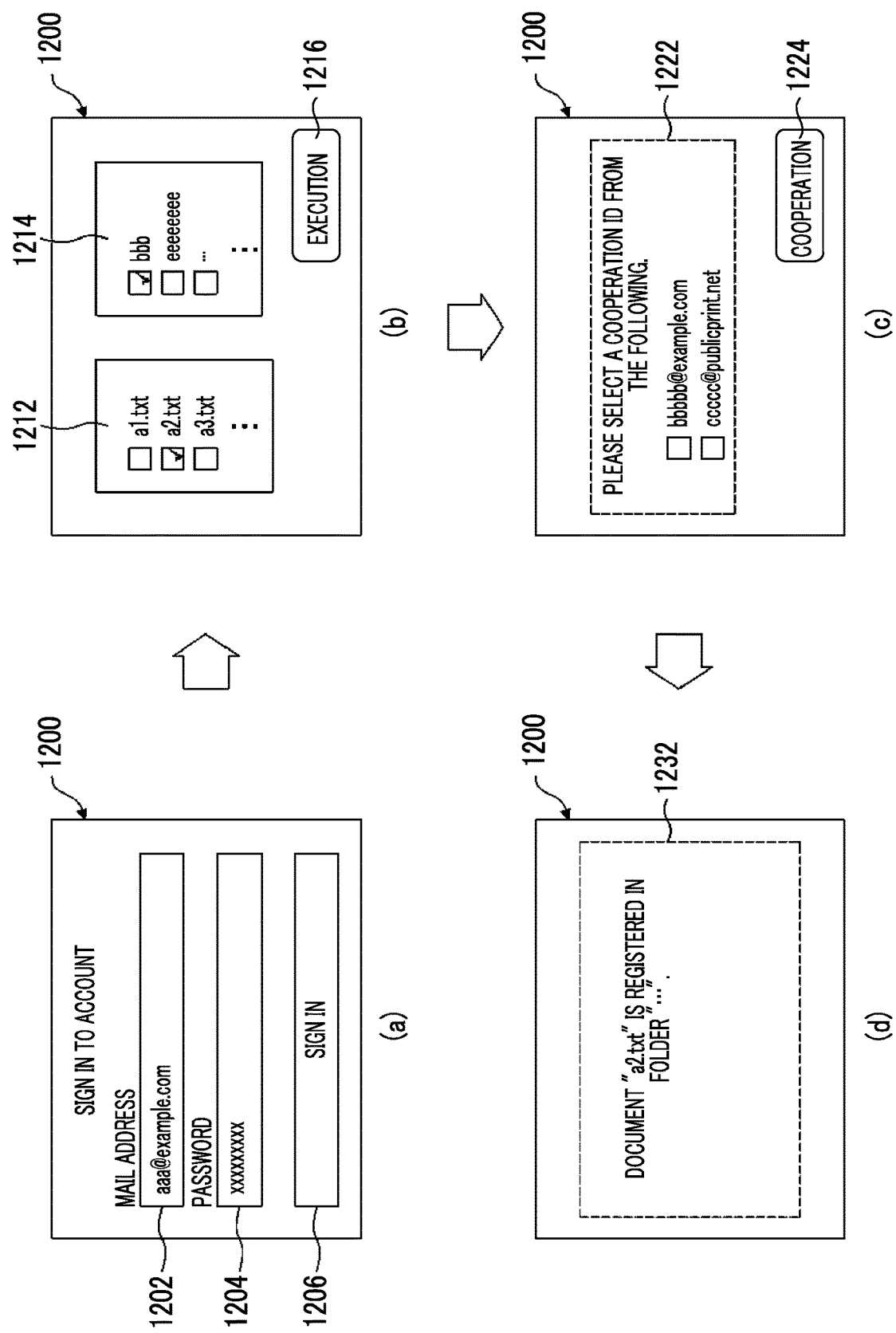
FIG. 12 is an explanatory diagram showing the processing example according to the exemplary embodiment.

FIG. 12 is an explanatory diagram showing the processing example according to the exemplary embodiment.

The example shown in a part (a) in FIG. 12 is displayed on the user terminal 190A in step S402 of the flowchart shown in the example of FIG. 4. An account entry field 1202, a password entry field 1204, and a sign-in button 1206 are displayed on the screen 1200.

The example shown in a part (b) in FIG. 12 is a service example in the cloud service A signed in in the example of the part (a) in FIG. 12, and the process requires a cooperation process for another cloud service B. For example, a process of storing a document stored in the cloud service A in the cloud service B can be performed. For example, a document designation area 1212, a service designation area 1214, and an execution button 1216 are displayed on the screen 1200. In the example shown in the part (b) in FIG. 12, it is shown that the document "a2.txt" in the document designation area 1212 is processed by a cloud service "bbb" in the service designation area 1214. As a result, the process from step S404 in the flowchart shown in the example of FIG. 4 is performed, and the process from step S508 in the flowchart shown in the example of FIG. 5 is performed.

The example shown in a part (c) in FIG. 12 is a display example of the candidate list in step S508 of the flowchart shown in the example of FIG. 5. For example, an account selection area 1222 and a cooperation button 1224 are displayed on the screen 1200. In the account selection area 1222, for example, "Please select a cooperation ID from the following." is displayed, and "bbbbb@example.com" and "ccccc@publicprint.net" are displayed selectively. Here, since "aaa@example.com" is the account information in the cloud service (cooperation source service ID: "1") of cooperation source as shown in the example of the account entry field 1202 in the part (a) in FIG. 12, the cooperation destination IDs "1" and "2" are permitted in the control flag field 940 in the first and fourth rows of the permission information A table 900 shown in the example of FIG. 9. Since the cooperation destination IDs "1" and "2" are the first and second lines (account ID: "1" and "2") in the account information table 1000 shown in the example of FIG. 10, "bbbbb@example.com" and "ccccc@publicprint.net" are selectively displayed. Then, one of the accounts is selected according to the operation of the user, and the cooperation button 1224 is selected.

The example shown in a part (d) in FIG. 12 shows the result of process in the cloud service of cooperation destination. That is, a service processing result display area 1232 is displayed on the screen 1200. In the service processing result display area 1232, for example, "the document "a2.txt" is registered in the folder " . . . "." is displayed, and this indicates that the process by the cloud service of cooperation destination has also ended.

The examples shown in FIG. 13 to FIG. 16 are used in the processing example of the flowchart shown in the example of FIG. 6.

FIG. 13 is an explanatory diagram showing an example of a data structure of the permission information B table 1300. The permission information B table 1300 is stored in the permission information management module 110.

The permission information B table 1300 includes a cooperation source service ID field 1310, a cooperation source account information field 1320, an SSO authentication permission target field 1330, and a local authentication permission target field 1340. The cooperation source service ID field 1310 stores the service ID of the cloud service of cooperation source. The cooperation source account information field 1320 stores account information in the cloud service of cooperation source. "ANY" indicates that all account information corresponds. The SSO authentication permission target field 1330 stores the tenant ID of the tenant which is a single sign-on (SSO) authentication permission target. "NULL" indicates that there is no tenant which is a permission target. The local authentication permission target field 1340 stores the tenant ID of the tenant which is the local authentication permission target. The SSO authentication permission target field 1330 and the local authentication permission target field 1340 store organizations subject to cooperation permit for each authentication scheme.

FIG. 14 is an explanatory diagram showing an example of a data structure of the tenant-specific authentication permission setting table 1400. The tenant-specific authentication permission setting table 1400 is stored in the account management module 130.

The tenant-specific authentication permission setting table 1400 includes a tenant ID field 1410, an SSO authentication cooperation availability field 1420, and a local authentication cooperation availability field 1430. The tenant ID field 1410 stores information (tenant ID) for uniquely identifying the tenant, in the exemplary embodiment. The SSO authentication cooperation availability field 1420 stores the availability ("TRUE": available, "FALSE": not available) of cooperation by SSO authentication. The local authentication cooperation availability field 1430 stores the availability of cooperation by local authentication. The SSO authentication cooperation availability field 1420 and the local authentication cooperation availability field 1430 store information indicating whether or not cooperation can be permitted for each authentication scheme.

FIG. 15 is an explanatory diagram showing an example of a data structure of the user-specific cooperation permission setting table 1500. The user-specific cooperation permission setting table 1500 is stored in the account management module 130.

The user-specific cooperation permission setting table 1500 includes a user ID field 1510 and a cooperation availability field 1520. The user ID field 1510 stores information (user ID) for uniquely identifying the user, in the exemplary embodiment. The cooperation availability field 1520 stores the availability of cooperation with respect to the user (account information). The cooperation availability field 1520 stores information indicating whether cooperation is possible or not.

FIG. 16 is an explanatory diagram showing the processing example according to the exemplary embodiment.

The example shown in a part (a) in FIG. 16 is displayed on the user terminal 190A in step S402 of the flowchart shown in the example of FIG. 4. An account entry field 1602, a password entry field 1604, and a sign-in button 1606 are displayed on the screen 1600.

The example shown in a part (b) in FIG. 16 is a service example in the cloud service A signed in, in the example of the part (a) in FIG. 16, and the process requires a cooperation process for another cloud service B. For example, a process of storing a document stored in the cloud service A in the cloud service B can be performed. For example, a document designation area 1612, a service designation area 1614, and an execution button 1616 are displayed on the screen 1600. In the example shown in the part (b) in FIG. 16, it is shown that the document "a2.txt" in the document designation area 1612 is processed by a service "bbb" in the service designation area 1614. As a result, the process from step S404 in the flowchart shown in the example of FIG. 4 is performed, and after determining "No" in step S504 of the flowchart shown in the example of FIG. 5, the process in the flowchart shown in the example of FIG. 6 is performed.

The example shown in the part (c) in FIG. 16 is a display example of the candidate list in step S608 of the flowchart shown in the example of FIG. 6. For example, an authentication scheme selection area 1622 and a next button 1624 are displayed on the screen 1600. In the authentication scheme selection area 1622, for example, "please select an authentication scheme enabling cooperation." is displayed, and "SSO authentication" and "local authentication" are displayed selectively. Here, since "aaa@example.com" is the account information in the cloud service (cooperation source service ID: "1") of cooperation source as shown in the example of the account entry field 1602 in the part (a) in FIG. 16, in the first and second rows of the permission information B table 1300 shown in the example of FIG. 13 ("aaa@example.com" also corresponds to "ANY"), tenant ID: "1, 2, 3" as the local authentication permission target field 1340, and tenant ID: "1" as the SSO authentication permission target field 1330 are extracted. The tenant IDs "1", "2", and "3" correspond to the first row, the second row, and the third row of the tenant-specific authentication permission setting table 1400 shown in the example of FIG. 14. Here, since the tenant IDs: "1" and "3" are allowed in the SSO authentication cooperation availability field 1420, and the tenant IDs: "2" and "3" are allowed in the local authentication cooperation availability field 1430, "SSO authentication" and "local authentication" are displayed selectively. Then, one of the authentication schemes is selected according to the operation of the user, and the next button 1624 is selected.

In the example shown in a part (d) in FIG. 16, the corresponding account is presented with the authentication scheme selected in the part (c) in FIG. 16. Here, an account in a tenant that enables the selected authentication scheme is presented. However, the user-specific cooperation permission setting table 1500 shown in the example of FIG. 15 indicates what account is cooperable. Here, an account selection area 1632 and a cooperation button 1634 are displayed on the screen 1600. Then, in the account selection area 1632, for example, "Please select a cooperation ID from the following." is displayed, and "bbbbb@example.com" and "ccccc@publicprint.net" are displayed selectively. Then, one of the accounts is selected according to the operation of the user, and the cooperation button 1634 is selected.

The example shown in a part (e) in FIG. 16 shows the result of process in the cloud service of cooperation destination. That is, a service processing result display area 1642 is displayed on the screen 1600. In the service processing result display area 1642, for example, "the document "a2.txt" is registered in the folder " . . . "." is displayed, and this indicates that the process by the cloud service of cooperation destination has also ended.

FIG. 17 is a flowchart showing the processing example (matching process example) according to the exemplary embodiment. That is, it is determined whether inconsistency has occurred between the mapping table 800 in the linking information management module 115 and the information in the permission information management module 110 or the account management module 130. In a case where inconsistency has occurred, the mapping table 800 is modified. For example, the permission information A table 900, the permission information B table 1300, the tenant-specific authentication permission setting table 1400, and the user-specific cooperation permission setting table 1500 may be changed by the operation of the administrator 192B. Specifically, in a case where the cooperation availability field 1520 in the user-specific cooperation permission setting table 1500 is changed from "TRUE" to "FALSE", the rows in the mapping table 800 corresponding to the user ID are erased.

In step 51702, it is determined whether or not there is a change in the permission information A table 900, the permission information B table 1300, the tenant-specific authentication permission setting table 1400, and the user-specific cooperation permission setting table 1500. If there is a change, the process proceeds to step S1704; otherwise, the process is on standby until there is a change.

In step S1704, one row in the mapping table 800 is extracted.

In step S1706, it is checked whether an inconsistency occurs in the combination in the permission information A table 900, the permission information B table 1300, the tenant-specific authentication permission setting table 1400, and the user-specific cooperation permission setting table 1500.

In step S1708, it is determined whether or not there is an inconsistency from the check result. If "there is an inconsistency", the process proceeds to step S1710; otherwise, the process proceeds to step S1712.

In step S1710, the combination is deleted.

In step S1712, it is determined whether or not all the rows in the mapping table 800 have been checked. If all the rows have been checked, the process is ended (step S1799); otherwise, the process returns to step S1704.

Figure 18:
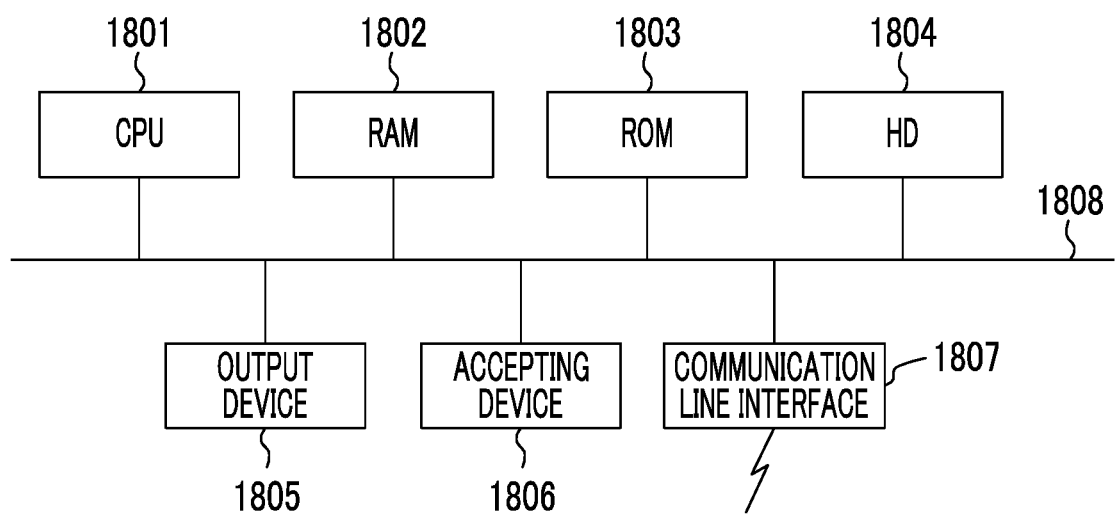
FIG. 18 is a block diagram showing an example of a hardware configuration of a computer that implements the exemplary embodiment.

As shown in FIG. 18, the hardware configuration of the computer on which the program as the exemplary embodiment is executed is a general computer, specifically, a computer that can be a personal computer, a server, or the like. That is, as a specific example, a CPU 1801 is used as a processing unit (arithmetic unit), and a RAM 1802, a ROM 1803, and an HD 1804 are used as storage devices. As the HD 1804, for example, a hard disk, a solid state drive (SSD) may be used. The computer is configured with the CPU 1801 that executes programs such as the request reception module 105, the permission setting module 120, the linking update module 125, the linking processing sequence generation module 135, and the linking information permission information matching module 140, the RAM 1802 that stores the program and data, the ROM 1803 that stores a program for activating the computer, or the like, the HD 1804 as an auxiliary storage device (which may be a flash memory or the like) having functions as the permission information management module 110, the linking information management module 115, and the account management module 130, an accepting device 1806 that accepts data based on a user's operation on a keyboard, a mouse, a touch screen, a microphone, or the like, an output device 1805 such as a CRT, a liquid crystal display, and a speaker, a communication line interface 1807 for connection with a communication network such as a network interface card, and a bus 1808 for exchanging data by connecting them. Plural computers may be connected to each other by a network.

Among the above-described exemplary embodiments, in the case of a computer program, a computer program which is software is read into a system of the present hardware configuration, and software and hardware resources cooperate with each other to realize the above exemplary embodiment.

The hardware configuration shown in FIG. 18 shows one configuration example, and the exemplary embodiment is not limited to the configuration shown in FIG. 18, but a configuration that can execute the module described in the exemplary embodiment may be used. For example, some of the modules may be configured with dedicated hardware (for example, an application specific integrated circuit (ASIC), or the like), some of the modules are in an external system and are connected through a communication line, and in addition, plural systems shown in FIG. 18 may be connected to each other through a communication line so that they cooperate with each other. Further, in addition to personal computers, in particular, it may be cooperated into portable information communication devices (including mobile phones, smartphones, mobile devices, wearable computers, or the like), information appliances, robots, copiers, faxes, scanners, printers, multifunction devices (information processing apparatuses having any two or more functions such as scanners, printers, copiers, and faxes), and the like.

Note that the above-described program may be provided by being stored in a recording medium, or the program may be provided by a communication unit. In that case, for example, the above-described program may be regarded as an invention of "a computer readable recording medium storing a program".

"Computer-readable recording medium storing a program" refers to a recording medium on which programs are recorded, which can be read by a computer, and is used for installing and executing programs, distributing programs, and the like.

Examples of the recording medium include a digital versatile disk (DVD) ("DVD-R, DVD-RW, DVD-RAM, or the like" which is a standard defined by a DVD forum and "DVD+R, DVD+RW, or the like" which is a standard defined by DVD+RW), a compact disc (CD) (a read-only memory (CD-ROM), a CD recordable (CD-R), a CD rewritable (CD-RW), or the like), a Blu-ray (registered trademark) Disc, a magneto-optical disk (MO), a flexible disk (FD), a magnetic tape, a hard disk, a read only memory (ROM), an electrically erasable and rewritable read only memory (EEPROM (registered trademark)), a flash memory, a random access memory (RAM), a secure digital (SD) memory card, or the like.

The whole or a part of the program may be stored or distributed by being recorded in the recording medium. Further, the program may be transmitted using a transmission medium, for example, a wired network used for a local area network (LAN), a metropolitan area network (MAN), a wide area network (WAN), the Internet, an intranet, an extranet, or the like, a wireless communication network, or a combination thereof, or may be carried on a carrier wave.

Furthermore, the program may be a part or the whole of another program, or may be recorded on a recording medium together with a separate program. Further, it may be divided and recorded on plural recording media. Further, it may be recorded in any manner as long as it can be restored, such as compression or encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a hardware processor, configured to:
sign in to a first account of a first service;
extract a second service that is able to be signed-in by using an account of the first service;
determine whether a second account of the second service is associated with the first account;
extract the second account that is permitted to be associated with the first account in response to the second account not being associated with the account of the first service; and
sign in to the extracted second account by using the first account.

2. An information processing apparatus comprising:
a first memory that stores an account in a cloud service and an organization subject to cooperation permission for each authentication scheme in association with each other;
a second memory that stores the organization and information indicating whether or not cooperation can be permitted for each authentication scheme in association with each other;
a third memory that stores an account and information indicating whether or not the account is cooperable with another account in association with each other;
a processor, configured to:
perform a first process that extracts an organization subject to permission corresponding to an account of a user who has signed in to a first cloud service of cooperation source, from the first memory;
perform a second process that extracts information indicating whether or not permission is possible for each authentication scheme corresponding to the organization subject to permission, from the second memory;
perform a third process that extracts information indicating whether or not an account of an organization for which permission is possible for each authentication scheme is cooperable with another account, from the third memory; and
allow the user to sign in to a second cloud service of cooperation destination, in a case of the extracted information indicating that cooperation is possible in the third process.

3. The information processing apparatus according to claim 2, wherein the processor further stores the account of the user and the account of the organization in association with each other in a table, in a case where the user has signed in to the second cloud service.

4. The information processing apparatus according to claim 3, wherein in a case where an account of a user who intends to sign in to the first cloud service is associated and stored in the table, the processor permits the user to sign in to the second cloud service.

5. The information processing apparatus according to claim 3, wherein the processor further performs maintenance by eliminating an inconsistency between a set of accounts stored in association with each other in the table and at least one of the first memory, the second memory, or the third memory.

6. The information processing apparatus according to claim 2, wherein the processor performs control so as to perform the first process, in a case where an account of a user who intends to sign in to the first cloud service is not cooperated with the account registered in the first cloud service.

7. The information processing apparatus according to claim 6, wherein the processor performs control so as to perform the second process, in a case where the account of the user who intends to sign in to the first cloud service is not registered in the second cloud service.

8. A non-transitory computer readable medium storing an information processing program causing a computer to:

sign in to a first account of a first service;

extract a second service that is able to be signed-in by using an account of the first service;

determine whether a second account of the second service is associated with the first account;

extract the second account that is permitted to be associated with the first account in response to the second account not being associated with the account of the first service; and sign in to the extracted second account by using the first account.

* * * * *